(12) United States Patent
Sandoval et al.

(10) Patent No.: US 8,041,526 B2
(45) Date of Patent: Oct. 18, 2011

(54) METHOD, APPARATUS AND SYSTEM FOR REDUCING WASTE IN PRODUCTION SYSTEMS

(75) Inventors: Francisco Bautista Sandoval, Zapopan Jalisco (MX); Efrain Sandoval Del Toro, Zapopan Jalisco (MX); Enrique Villasenor Murillo, Tenala Jalisco (MX)

(73) Assignee: Thomson Licensing, Boulogne, Billancourt (FR)

( * ) Notice: Subject to any disclaimer, the term of this patent is extended or adjusted under 35 U.S.C. 154(b) by 213 days.

(21) Appl. No.: 12/226,830

(22) PCT Filed: May 1, 2006

(86) PCT No.: PCT/US2006/016490
§ 371 (c)(1),
(2), (4) Date: Oct. 29, 2008

(87) PCT Pub. No.: WO2007/130019
PCT Pub. Date: Nov. 15, 2007

(65) Prior Publication Data
US 2009/0099679 A1 Apr. 16, 2009

(51) Int. Cl.
*G01N 37/00* (2006.01)
*G06F 11/30* (2006.01)
*G21C 17/00* (2006.01)
*G06F 19/00* (2011.01)

(52) U.S. Cl. .......... 702/84; 702/182; 702/183; 702/184; 700/108; 700/112; 700/115

(58) Field of Classification Search .......... 700/105–106, 700/108–110, 112, 115–116, 169–171, 228–230; 702/84, 182–184; 340/3.43–3.44, 3.71
See application file for complete search history.

(56) References Cited

U.S. PATENT DOCUMENTS

| | | | | |
|---|---|---|---|---|
| 3,845,286 A | * | 10/1974 | Aronstein et al. | 700/102 |
| 4,306,292 A | * | 12/1981 | Head, III | 700/100 |
| 6,076,652 A | * | 6/2000 | Head, III | 198/341.07 |

(Continued)

FOREIGN PATENT DOCUMENTS

| | | |
|---|---|---|
| KR | 10045770 | 11/2004 |
| KR | 100604523 | 7/2006 |
| WO | WO9008638 | 8/1990 |

OTHER PUBLICATIONS
Search Report Dated Jan. 2007.

*Primary Examiner* — Ramesh Patel
(74) *Attorney, Agent, or Firm* — Robert D. Shedd; Robert B. Levy

(57) ABSTRACT

A production system includes at least one production component having a production cycle which is interruptible by a detected production failure, at least one detector configured to monitor an output of the at least one production component, the detector configured to detect a production failure and to generate a signal indicative of the production failure, and a control unit. The control unit is configured to, in response to the signal from the detector, cause the respective production component to reject production material for a first predetermined duration of time, and in response to the expiration of the first predetermined duration of time, to slow down production for at least a second predetermined duration of time. The control unit can further return the production system to a normal production state in response to receiving a restart signal before the expiration of the first or second predetermined duration of time.

16 Claims, 3 Drawing Sheets

U.S. PATENT DOCUMENTS

| | | | |
|---|---|---|---|
| 6,678,627 B1 * | 1/2004 | Starr | 702/119 |
| 7,274,971 B2 * | 9/2007 | Brill et al. | 700/230 |
| 7,561,937 B2 * | 7/2009 | Reed et al. | 700/109 |
| 7,720,557 B2 * | 5/2010 | Teferra et al. | 700/112 |
| 2002/0035447 A1 * | 3/2002 | Takahashi et al. | 702/188 |
| 2004/0193300 A1 * | 9/2004 | Rice et al. | 700/101 |
| 2005/0159835 A1 * | 7/2005 | Yamada et al. | 700/109 |
| 2007/0284774 A1 * | 12/2007 | Sandoval et al. | 264/39 |
| 2008/0033589 A1 * | 2/2008 | Ontalus et al. | 700/109 |
| 2008/0221721 A1 * | 9/2008 | Reed et al. | 700/109 |

* cited by examiner

METHOD, APPARATUS AND SYSTEM FOR REDUCING WASTE IN PRODUCTION SYSTEMS

This application claims the benefit, under 35 U.S.C. §365 of International Application PCT/US2006/016490, filed May 1, 2006, which was published in accordance with PCT Article 21(2) on Nov. 15, 2007 in English.

FIELD OF THE INVENTION

The present invention generally relates to production or manufacturing systems and, more particularly, to a method, apparatus and system which provide a cycle slowdown feature to control and limit waste in production lines.

BACKGROUND OF THE INVENTION

Production systems, such as injection molding systems, which are employed to create production materials such as optical disks, usually include more than one production component, such as injection molding machines. The injection molding machines form clear substrates employed in the manufacture of optical disks, such as DVDs, CDs or other plastic media. In a system where two or more injection molders are employed, it is sometimes difficult to shut parts of the system down when other parts are producing rejectable product.

In DVD replication lines, two or more injection molding machines, one metalizer-bonding machine and one scanner may be integrated. The injection molding machines have a drop limit condition (the condition is fixed by software), such that when the quality of a disk as measured by the scanner is inadequate, the injection molding machines are shut down. One major disadvantage is that with the drop limit, it is not possible to run lower than 20 shots (discs) per injection molding machine. This is the minimal number of shots before the line can be shut down. Therefore, with every downstream interruption of production, at least twenty clear substrates are wasted by each injection molding machine.

In addition, in prior art production systems, completely shutting down the production components causes startup delays when trying to restart the production system. Also, if one injection molding machine stops the other machines are unaware of the shut down and continue running and making clear discs which will be wasted.

SUMMARY OF THE INVENTION

The present invention addresses the deficiencies of the prior art by providing a method, apparatus and system which provide a reject cycle and a cycle slowdown feature to control and limit waste in production lines.

In one embodiment of the present invention, a method for reducing waste in a production line includes rejecting production material for a first predetermined duration of time in response to a detected production failure and slowing down production for at least a second predetermined duration of time in response to the expiration of the first predetermined duration of time. Slowing down the production of a production line after a detected production failure in accordance with the present invention reduces waste of the production materials. Alternatively and in accordance with the present invention, the production line can be returned to a normal production state in response to a restart signal being received before the expiration of the first or the second predetermined duration of time.

In an alternate embodiment of the present invention, a production system includes at least one production component having a production cycle which is interruptible by a detected production failure, at least one respective detector configured to monitor an output of the at least one production component, the detector configured to detect a production failure and to generate a signal indicative of the production failure, and a control unit configured to, in response to the signal from the at least one detector, cause the at least one respective production component to reject production material for a first predetermined duration of time after the detected failure, and in response to the expiration of the first predetermined duration of time, to slow down production for at least a second predetermined duration of time. Alternatively, the control unit can be further configured to shut down the production system in response to the expiration of the second predetermined duration of time. Even further, the control unit can be further configured to return the production system to a normal production state in response to receiving a restart signal before the expiration of the first or the second predetermined duration of time.

In an alternate embodiment of the present invention, an apparatus for reducing waste in a production system includes a first communication link with at least one production component having a production cycle which is interruptible by a detected production failure and a second communication link with at least one respective detector configured to monitor an output of the at least one production component, the detector configured to detect a production failure and to generate a signal indicative of the production failure, the apparatus configured to, in response to the signal from the at least one detector, cause the at least one respective production component to reject production material for a first predetermined duration of time after the detected failure, and to, in response to the expiration of the first predetermined duration of time, slow down production for at least a second predetermined duration of time.

In an embodiment of the present invention, a production slow down is accomplished by increasing the cycle time of a production component. In addition, a production component can be stopped if other production components of the same line are not functioning correctly.

BRIEF DESCRIPTION OF THE DRAWINGS

The teachings of the present invention can be readily understood by considering the following detailed description in conjunction with the accompanying drawings, in which.

Figure 1:
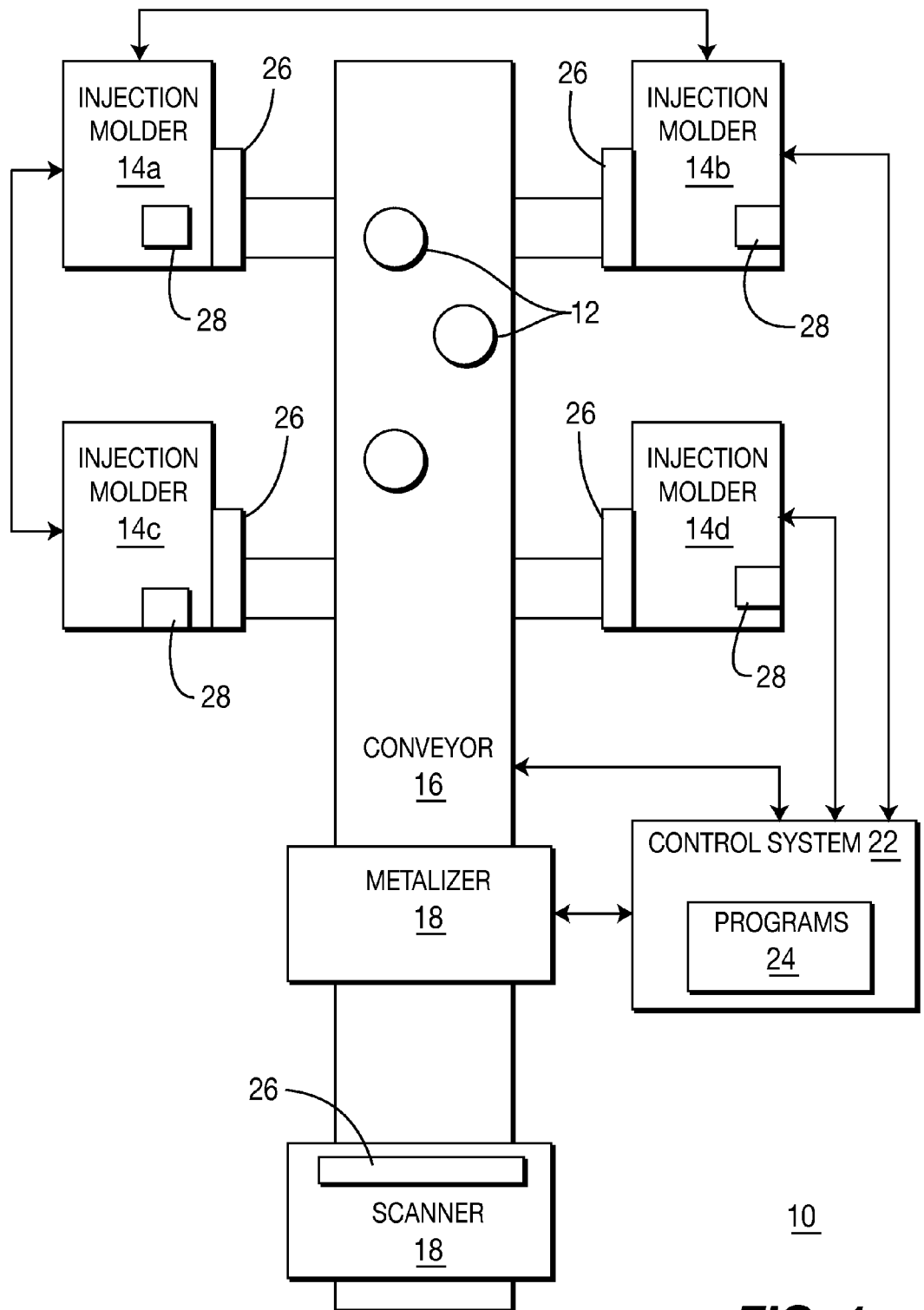
FIG. 1 depicts a high level block diagram of a disk manufacturing system in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method, system and apparatus which provide a cycle slowdown feature for production systems and production components, such as, injection molding machines, to reduce waste of production materials such as clear substrates. Although the present invention will be described primarily within the context of a system which is particularly useful in plastic molding production and in particular, DVD (Digital Video Discs) processes, compact disk (CD) processes, or any other optical disk manufacturing processes, the specific embodiments of the present invention should not be treated as limiting the scope of the invention. It will be appreciated by those skilled in the art and informed by the teachings of the present invention that the concepts of the present invention can be advantageously applied in not only disk production lines, but also in other similar production systems (including any injection or other molding system) that utilize a production cycle in which the quality and/or quantity of the output can be monitored. In addition, the present invention is applicable to any manufacturing process including DVD, CD, video discs or any other injection molded media.

FIG. 1 depicts a high level block diagram of a disk manufacturing system 10 in accordance with an embodiment of the present invention. Details of the individual block components making up the system architecture are known to skilled artisans, and will only be described in details sufficient for an understanding of the present invention. The disk manufacturing system 10 of FIG. 1 illustratively includes injection molders 14a-d. Although four injection molders 14a-d are depicted in FIG. 1, the present invention is applicable to such systems including substantially any number of injection molders.

In one embodiment of the present invention, the injection molders 14 are of the type known in the art. For example, the injection molders 14 of FIG. 1 include a mold, which is employed to mold plastic or other such materials. The plastic is fed into a hopper (not shown) and heated to a molten or liquefied state. The plastic is extruded by an extruder to provide pressure in the molten plastic. The mold, which is typically split in half and held together by robotic arms or other mechanical devices, is cooled. When the mold is closed the extruder rapidly delivers molten plastic into the cooled mold or molds. The molten plastic is cooled in the mold and solidifies. The mold is then opened and the plastic retains the form of the mold (e.g., a disk 12).

The manufactured disks 12 are deposited on a conveyor 16 and transported for further processing. For example, the disks 12 may be transported to a metalizer 18 where a layer of material, such as a reflective metal, can be deposited on the disks 12. Other processes can be employed before, during or after the metalizer 18, the descriptions of which have been omitted for simplicity.

A scanner 20 or other similar inspection device includes an optical scanning system and programs implemented to determine the presence of the disks 12 on the conveyor 16, and/or to examine the quality of the disks 12 on the conveyor 16. A control system 22 provides operational commands to each piece of equipment in the manufacturing system 10. The control system 22 can include one or more computers or computer systems which monitor system parameters to detect manufacturing problems or failures and to monitor the quality of the output of the manufacturing system 10. The control system 22 includes programs 24 that control the various operations of the manufacturing system 10 and store/provide set points and settings for molding cycles, metalizer parameters, scanning resolutions, and the like, for the various components of the disk manufacturing system 10.

The control system 22 can work in conjunction with devices and/or software 28 loaded on or at each component of the disk manufacturing system 10. The device/software 28 can include memory from storing system parameters and cycle information as well as processing logic and other devices. In addition, interfaces between the control system 22 and each device may be located in or at the control system 22 or at the device. For example, if the control system 22 includes a personal computer, an interface card inserted in a computer port can be used for permitting communications of commands and data between, for example, the injection molders 14 and the personal computer. It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The scanner 20 can be employed to detect an output of disks 12 at the output of each of the injection molders 14, at pairs of injection molders or groups of injection molders 14, as depicted in FIG. 1. During operation, the scanner 20 can detect the lack of disks or less than a desired number of disks at the output of a single injection molder or at a group of injection molders. In accordance with the present invention a slow down cycle is employed, instead of stopping a manufacturing cycle and waiting for the injection molders to stop, which typically results in wasted manufacturing material (e.g., 20 wasted disks) as is currently the process in prior art manufacturing systems.

In FIG. 1, electronic hardware 26 is employed at the scanner 20, at the injection molders 14 or at other locations on the conveyor 16 or elsewhere in the disk manufacturing system 10. For example, at the scanner 20, the hardware 26 can be employed as detectors for determining conditions of the production line. The electronic hardware 26 can include sensors (e.g., optical sensors) or other detectors to detect and determine when a production failure condition arises for which the control system 22 stops the production process and/or provides a slowdown period in accordance with the present invention. The hardware 26 can include disk sensors (i.e., at the end of the disk conveyor 16 where the injection molders 14 place the disks 12) capable of generating alert signals under predetermined conditions. In alternate embodiments of the present invention, the failure detection signals can also be generated by the injection molders 14 themselves, for example, from programmable logic circuits that can be included in the injection molders 14.

In the disk manufacturing system 10 of FIG. 1, the hardware 26 is coupled to the control system 22 and generates an indication of production failure events that need to be addressed. For example, the hardware 26 at scanner 20 can detect whether there are any disks 12 at the end of the conveyor 16, whether the conveyor 16 is running with disks 12 on it, whether the number of disks on the conveyor 16 has decreased, etc. In one example of production failure detection, if the hardware 26 does not detect any disks 12 on the conveyor 16 for more than a predetermined amount of time (e.g., 7 seconds), the hardware 26 can generate a signal to communicate to the control system 22, which can then cause the disk manufacturing system 10, and specifically the injection molders 14, to begin either a reject, a slow down or a shutdown mode depending on the detected production failure conditions and the application. Similarly, hardware 26 located near or at the injection molders 14 can detect the output for each injection molder 14 and can generate alert signals to be communicated to the control system 22 and/or to other components of the disk manufacturing system 10 (e.g., other injection molders 14) to indicate a production failure and to enter the production processes of the present invention.

The hardware 26 described above with respect to FIG. 1 can function as a communication network alerting various components of the disk manufacturing system 10 whether there is a production failure associated with other components that can affect it's operation. In accordance with the present invention, the hardware 26 can include software programs to support a communication protocol to enable communications between the various components and the control system 22 of the disk manufacturing system 10. The control system 22 can function as a server or a controller to perform higher level monitoring of the production line.

Figure 2:
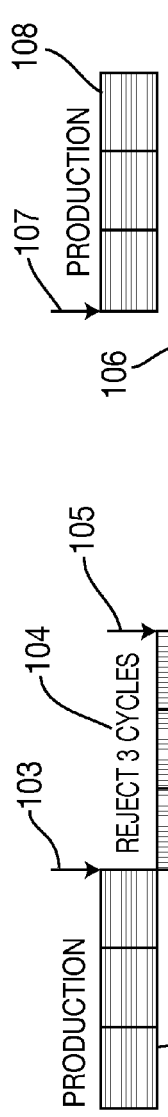
FIG. 2 depicts a schematic diagram of a first reject and slow down process suitable for use in the production system of FIG. 1 in accordance with an embodiment of the present invention.

FIG. 2 depicts a schematic diagram of a first reject and slow down process suitable for use in the disk manufacturing system 10 of FIG. 1 in accordance with an embodiment of the present invention. Referring to FIG. 2, a first example is illustrated in which a downstream production failure has occurred and a signal is communicated to the control system 22 indicative of the production failure. In the example of FIG. 2, the injection molders (14) of the disk manufacturing system 10 have been programmed with the settings depicted in TABLE 1, which follows:

TABLE 1

| Action: | Setting: |
| --- | --- |
| Reject cycles before switching to slowdown | 3 cycles |
| Time before machine stoppage | 1 minute |
| Extended cycle time | 13 seconds |

The settings depicted in TABLE 1 above are merely illustrative and should not be considered limitations of the invention. That is, the settings in TABLE 1 can be varied depending on the process, and set points and cycles may be programmed into the individual injection molders or controlled by the control system. The parameters of TABLE 1 are not exact and are provided merely for illustrative purposes. Each injection molder can include its own settings, and the injection molders may be grouped or paired to be responsive to a common signal or event.

In the production time scale of FIG. 2, production is proceeding normally as indicated in region 102. An event occurs in region 103 indicative of a production failure. For example, a production failure may include any number of issues, such as a decrease in the number of disks on a conveyor of the disk manufacturing system 10 of FIG. 1 or inadequate quality of one or more disks on the conveyor. That is, detectors 26 can be configured to detect the presence and/or the amount of production material being produced by each single production component (e.g., each injection molder 14) or, alternatively, by all of the production components (e.g., all of the injection molders 14). Furthermore, the production components and/or the control system 22 can be programmed to contain a predetermined production material count or range indicative of a normal production state. The detected numbers of production material can be compared to the predetermined material count or range and if the detected number is out of range (i.e., higher or lower than the predetermined amount) a signal can be communicated to the control system 22 indicative of a production failure. Similarly, the detection hardware 26 can be configured to monitor the quality of the production material as described above. Again, if the quality of the production material does not coincide with a predetermined quality (i.e., label out of focus or illegible) a signal can be communicated to the control system 22 indicative of a production failure.

In response to the failure event 103, the downstream production is stopped and the injection molders (14) begin rejecting disks as waste. Such a rejection mode is depicted by region 104 of FIG. 2. In the embodiment of the present invention of FIG. 2, the rejection mode lasts for a duration of 3 cycles. Such a configuration was programmed as indicated in TABLE 1. During the predetermined number of cycles of the rejection mode, any disks in the injection molders (14) will be rejected.

Referring back to the embodiment of FIG. 2, after 3 cycles, at event 105, the injection molders (14) automatically switch to a slowdown mode as depicted in region 106 of FIG. 2. The duration of the slowdown mode is also programmed as depicted in TABLE 1 (e.g., 13 extra seconds per cycle). During the slowdown mode, several processes may take place. For example, in one embodiment of the present invention, the injection molders (14) continue to make disks at a much slower rate. That is, in such an embodiment of the present invention, molding cycle times may be altered (e.g., increased) to reduce the number of disks produced during the slowdown period. Such molding cycles can include cooling times, mold actuation times and other molding processes.

With an increase in molding cycle times, production material waste is significantly reduced since the injection molders (14) receive and, as such, reject fewer disks as a result of the slowdown. In accordance with the present invention, injection molding machines and other equipment continue to operate to anticipate a quick restart. That is, if a restart is received during the slowdown mode, normal production can continue immediately. This reduces or eliminates any startup delays that would otherwise occur if production was stopped completely. For example, if the production failure event 103 is corrected before the end of the slow down period (e.g., 1 minute in TABLE 1), a control signal can be communicated to the injection molders (14), event 107 in FIG. 2, to restart the production process. That is, and as depicted in FIG. 2, the disk manufacturing system 10 can restart normal production if a restart signal is received by the production component or system in the slowdown mode or if the control system 22 receives a restart signal before the expiration of the slowdown mode. In alternate embodiments of the present invention, however, production can be stopped immediately after detecting the production failure depending on the severity of the failure event (e.g., event 103).

Figure 3:
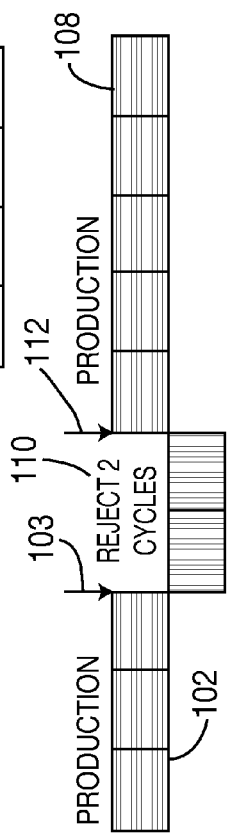
FIG. 3 depicts a schematic diagram of a reject process in which a restart command during the reject process restarts production in accordance with an embodiment of the present invention.

FIG. 3 depicts a schematic diagram of a reject process in which a restart command during the reject process restarts production in accordance with an embodiment of the present invention. Referring to FIG. 3, normal production cycles 102 are interrupted by an event 103 (i.e., a production failure event) indicating that a downstream production processes has been interrupted. Since the downstream production process has stopped, the injection molders (14) begin a rejection mode 104 and begin rejecting disks as waste. However, in the example of FIG. 3, the injection molders (14) receive a restart signal 112 to once again begin the production mode 108 before the expiration of the 3 cycles of the reject mode. In this example, the restart signal is sent at cycle 2 of the reject mode 110 (which is less than the 3 cycle parameter as indicated in TABLE 1). In the example of FIG. 3, production is restarted with minimal waste and no start up delays.

Figure 4:
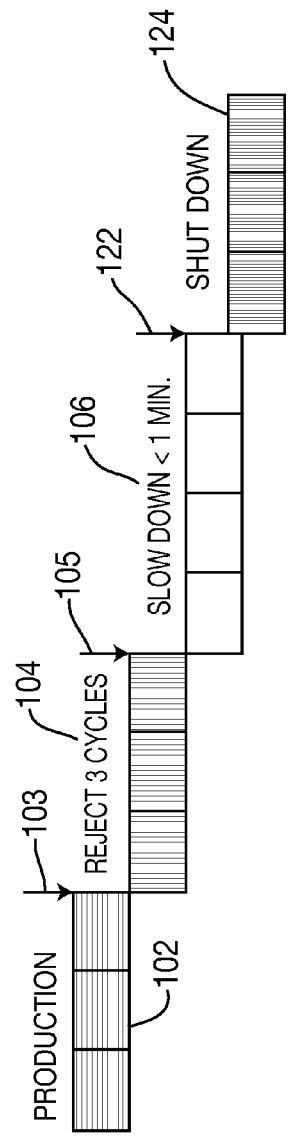
FIG. 4 depicts a schematic diagram of a second reject and slow down process in which a slow down period expires and the equipment is shut down in accordance with an embodiment of the present invention.

FIG. 4 depicts a schematic diagram of a second reject and slow down process in which a slow down period expires and the equipment is shut down in accordance with an embodiment of the present invention. Referring to FIG. 4, normal production cycles 102 are interrupted by an event 103 (i.e., a production failure event) indicating that a downstream production processes has been interrupted. Since the downstream production process has stopped, the injection molders (14) begin a rejection mode 104 and begin rejecting disks as waste similar to the example of FIG. 3. After 3 cycles of the rejection mode 104, the injection molders (14) automatically switch to slowdown mode 106 beginning at point 105 and remain in slowdown mode for the duration of the slowdown period (e.g., 1 minute in TABLE 1). In one embodiment of the present invention, the molding cycles are increased as described above to achieve the slowdown process. In the example of FIG. 4, after one minute in the slowdown mode 106, the injection molders (14) do not receive a restart signal and as such, the injection molders (14) stop production at event 122. The molding process ceases after the last disc is removed from the injection molders (14) during the shutdown mode 124.

Figure 5:
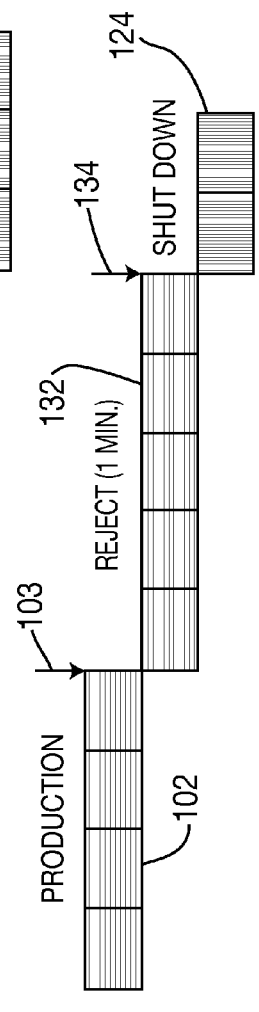
FIG. 5 depicts a schematic diagram of a reject process that is entered as a result of the shutting down of an alternate injection molder in accordance with an embodiment of the present invention.

FIG. 5 depicts a schematic diagram of a reject process that is entered as a result of the shutting down of an alternate injection molder in accordance with an embodiment of the present invention. Referring to FIG. 5, the slowdown period and reject modes may also be applicable to events other than downstream events. For example, if one or more injection molders shut down or experience a failure event, the control system or other production components can enter a reject mode and/or a slowdown mode. That is, as depicted in FIG. 5, a first injection mold apparatus has stopped operating at event 130, and a second injection mold apparatus, with which it is paired or grouped, begins rejecting disks as waste during a reject mode 132. After 1 minute in the reject mode 132, the second injection mold apparatus is stopped and enters a shutdown mode 124. Alternatively, the rejection mode 132 may further comprise a slowdown period (not shown) for facilitating a restart signal from the control system or the injection molder that was initially stopped. In such an embodiment, if the restart signal is received before the expiration of the slowdown period, at least one of the molders can reenter production without being shut down.

Figure 6:
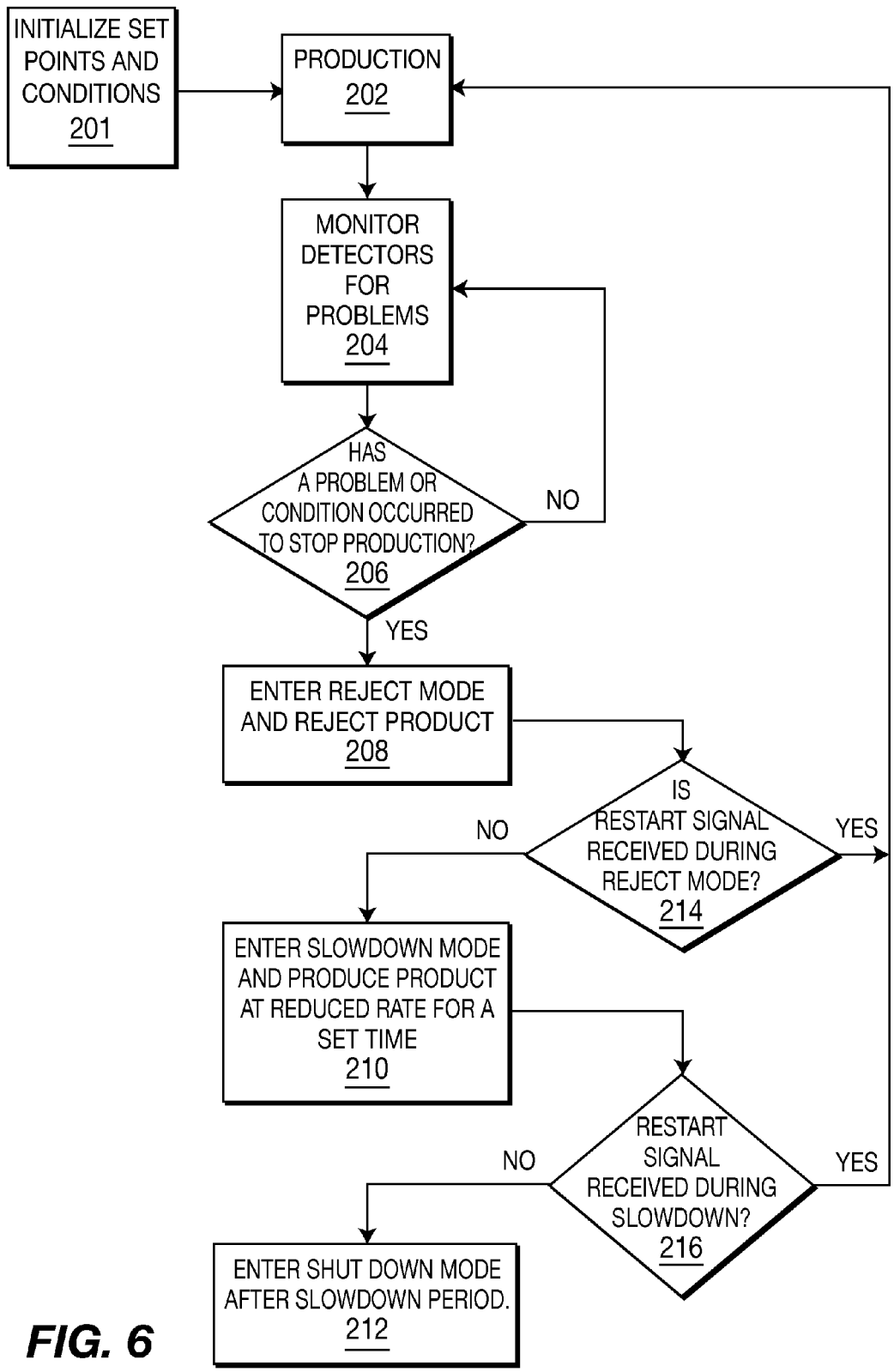
FIG. 6 depicts a flow diagram of a method for monitoring and applying the processes of the present invention in a production line in accordance with an embodiment of the present invention.

FIG. 6 depicts a flow diagram of a method for monitoring and applying the processes of the present invention in a production line in accordance with an embodiment of the present invention. The method depicted in FIG. 6 can be implemented in hardware, software or a combination of both. The method begins at step 201 where set points and failure conditions are initialized for the control system and for the other components of a disk manufacturing system such as the disk manufacturing system 10 of FIG. 1. Examples of such set points and failure conditions are illustrated in TABLE 1, above. For example such parameters can include rejection mode duration, slowdown period duration, triggering events that initiate the rejection mode, slowdown and/or shutdown modes, and the like. The described events and failure conditions can be set in the control system, in the injection molders, in the sensors or in substantially any other component of the disk manufacturing system. In addition, conditions can be set for each of the components that are responses to failure conditions that occur in other components of the disk manufacturing system. For example, if one injection molder experiences a failure condition, other injection molders can be placed in a slowdown mode or shutdown mode in accordance with the present invention. The method proceeds to step 202.

At step 202, production in the disk manufacturing system is commenced. The commencement of production can include ordinary, original production commencement, the return to a normal production speed after a slowdown, or the reinitiating of production after a shutdown. The method then proceeds to step 204.

At step 204, detectors or scanners, as described above, are employed to monitor the disk manufacturing system for production failures such as a reduction in quality of output and/or whether any shutdowns have occurred at individual components of the disk manufacturing system. The monitoring process of the present invention continues throughout the disk manufacturing process. The method then proceeds to step 206.

At step 206, the monitoring is employed to determine when a production failure occurs. Such production failures can include, but are not limited to, a downstream shutdown of production, a change in the quality of production, or a change in quantity of production, which can all be considered a failure in quality of production. Such failures can be determined, for example, by comparing measured data with predetermined criteria for production quality such as number of disks to be produced in a specified period of time, label or print quality or resolution, cycle times, period times, triggering events for slowdown or shutdown modes, and the like. Such predetermined criteria can be stored in the control system or in the individual components of the disk manufacturing system.

If a production failure is not detected in step 206, monitoring continues in step 204. If a production failure is detected, a rejection mode is begun as depicted in step 208. In one embodiment of the present invention, a single, failed component enters a rejection mode for a predetermined period of time (e.g., 3 cycles) and discards as waste all current production material being manufactured by said component. Alternatively and in an alternate embodiment of the present invention, depending on the application and the location of the component experiencing the production failure, the entire disk manufacturing system enters a rejection mode and all production material being manufactured by the disk manufacturing system is discarded as waste. As depicted in step 214, if during the reject mode a restart signal is received by the failed component or the disk manufacturing system, the method returns to step 202. If a restart signal is not received during the rejection mode, the method then proceeds to step 210.

At step 210, after the expiration of the rejection mode period, the failed component or, alternatively, the disk manufacturing system enters a slowdown mode for a predetermined second period of time. During the slowdown mode of the present invention, the failed component or alternatively, the disk manufacturing system, is slowed down to reduce waste and to postpone shutting down the failed component or alternatively, the disk manufacturing system, to alleviate the delay and overhead costs associated with having to reinitialize the disk manufacturing system from a shutdown state. In one embodiment of the present invention, a slowdown can be accomplished by adding time to a molding cycle to increase the amount of time needed to produce a single disk. As depicted in step 216, if during the slowdown mode a restart signal is received by the failed component or the disk manufacturing system, the method returns to step 202. If a restart signal is not received during the slowdown mode, the method then proceeds to step 212.

At step 212, the failed component or alternatively, the disk manufacturing system is shut down after the expiration of the slowdown period. Once the problem that caused the shutdown is resolved, the method of the present invention returns to step 202.

Having described preferred embodiments for a method, system and apparatus for providing a cycle slowdown feature to control and limit waste (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A method for use in a production line, comprising:
   in response to a production failure detected by at least one electronic hardware monitoring at least one of a quantity and a quality of production material in said production line, rejecting said production material for a first predetermined duration of time after the detected failure; and
   in response to expiration of the first predetermined duration of time, slowing down production for at least a second predetermined duration of time.

2. The method of claim 1, further comprising:
   in response to expiration of the second predetermined duration of time, shutting down the production line.

3. The method of claim 1, wherein the production failure comprises at least one of a quantity of production material existing in said production line not matching a predetermined quantity, a production cycle time not matching a predetermined cycle time, a quality of production material in said production line not matching a predetermined quality, and a failure of a production component.

4. The method of claim 1, wherein said production line comprises an injection molding manufacturing system.

5. The method of claim 4, wherein said production material comprises optical disks.

6. The method of claim 1, wherein said slowing down production comprises increasing a cycle time for manufacturing said production material.

7. The method of claim 1, further comprising, in response to receiving a restart signal during said second predetermined duration of time, returning said production line to a normal production state.

8. The method of claim 1, further comprising, in response to receiving a restart signal during said first predetermined duration of time, returning said production line to a normal production state.

9. A production system, comprising:
   at least one electronic hardware configured for monitoring at least one of a quantity and a quality of production material in the production system for detecting a production failure; and
   at least one control unit configured for, in response to said detected production failure, causing production material to be rejected for a first predetermined duration of time after the detected failure; and in response to expiration of the first predetermined duration of time, causing production to be slowed down for at least a second predetermined duration of time.

10. The system of claim 9, wherein said at least one control unit is further configured for:
    in response to expiration of the second predetermined duration of time, shutting down the production line.

11. The system of claim 9, wherein said production failure comprises at least one of a quantity of production material existing in said production line not matching a predetermined quantity, a production cycle time not matching a predetermined cycle time, a quality of production material in said production line not matching a predetermined quality, and a failure of a production component.

12. The system of claim 9, wherein said system is an injection molding manufacturing system.

13. The system of claim 12, wherein said production material comprises optical disks.

14. The system of claim 9, wherein said slowing down production comprises increasing a cycle time for manufacturing said production material.

15. The system of claim 9, wherein said at least one control unit is further configured for:
    in response to receiving a restart signal during said second predetermined duration of time, returning said production line to a normal production state.

16. The system of claim 9, wherein said at least one control unit is further configured for:
    in response to receiving a restart signal during said first predetermined duration of time, returning said production line to a normal production state.

\* \* \* \* \*